Nov. 10, 1942.  H. A. HADLEY  2,301,177
WEIGHT-REGISTERING APPARATUS
Filed Nov. 27, 1939  3 Sheets-Sheet 1

INVENTOR
HARLAN A. HADLEY
BY Paul L. Krohn
ATTORNEY

Nov. 10, 1942.  H. A. HADLEY  2,301,177
WEIGHT-REGISTERING APPARATUS
Filed Nov. 27, 1939  3 Sheets-Sheet 2

INVENTOR
HARLAN A. HADLEY
BY
Paul L. Kiehler
ATTORNEY

Nov. 10, 1942. H. A. HADLEY 2,301,177
WEIGHT-REGISTERING APPARATUS
Filed Nov. 27, 1939 3 Sheets-Sheet 3
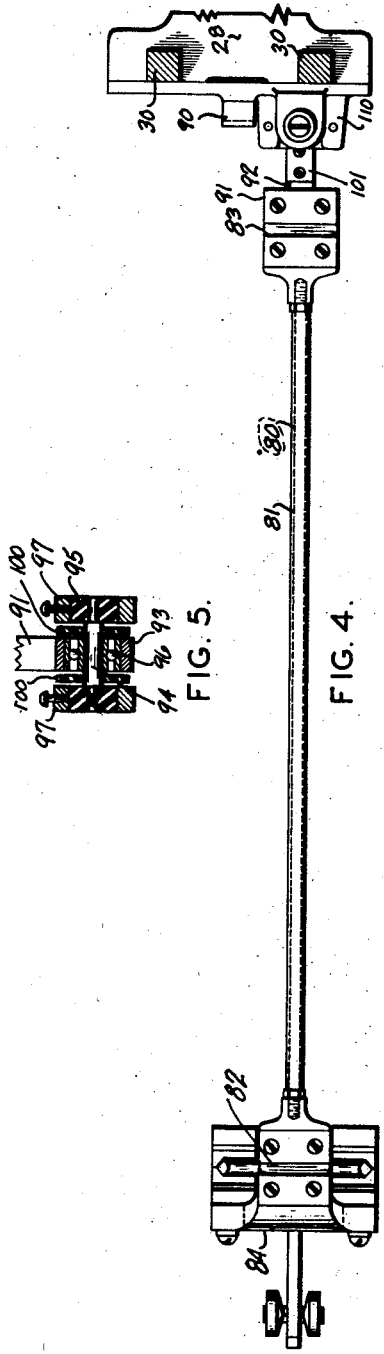
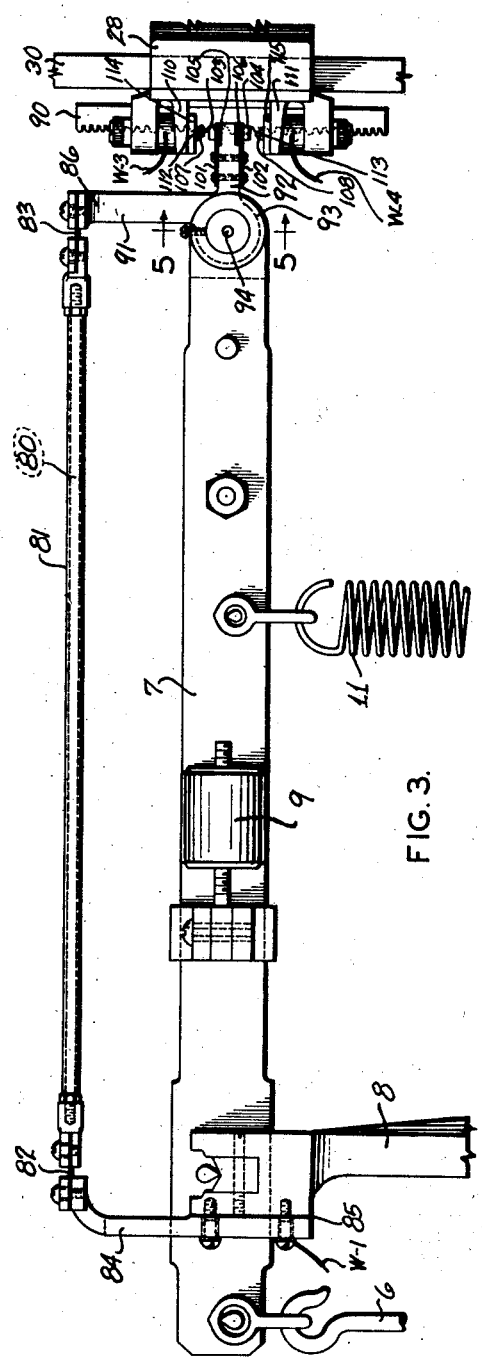
INVENTOR
HARLAN A. HADLEY
BY
ATTORNEY Patented Nov. 10, 1942

2,301,177

UNITED STATES PATENT OFFICE

2,301,177

WEIGHT-REGISTERING APPARATUS

Harlan A. Hadley, River Edge, N. J., assignor to Fairbanks, Morse & Co., Chicago, Ill., a corporation of Illinois Application November 27, 1939, Serial No. 306,282

12 Claims. (Cl. 265—28)

This invention relates to improvements in weight registering apparatus, particularly to improved mechanism for obtaining an electrically influenced registration of fluctuating weight values, for example, in conveyor weighing apparatus employing an integrator mechanism.

A principal object of the invention, stated broadly, consists in the provision of improved means for electrically or electromechanically influencing a registering device, in response to scale beam movement; the term "registering" being herein employed in a broad sense to indicate an accumulation of weight values or the like, in a totalizing device.

Otherwise expressed, an object of the invention is attained in improved means for translating scale beam movements through electromechanical means for registering purposes.

More particularly expressed with reference to the selected embodiment of the invention, its purposes include an improved contactor assembly for obtaining more or less frequent reversals of a reversible electric servo-motor, particularly in connection with such servo-motors as are utilized in functional and structural combination with a scale beam.

Yet another object stated more particularly with respect to preferred structure, is attained in the provision on the outer end of a scale beam, of a pivotally mounted contactor bracket and arm carrying opposed electrical contacts adapted to cooperate with companion contacts carried by a movable cooperating bracket, in a weight integrating mechanism; the contacts being electrically associated with a motor and appurtenances, for effecting a physical movement of a rotating integrator element, responsive to changes in position of an associated scale beam.

A still further object, generally stated, is attained in an improved provision for shifting certain of the beam-mounted contacts with respect to the beam, and in response to beam movement, so as to maintain a more favorable angular relation between the beam-carried contacts and others cooperating therewith. This provision serves the dual purpose of providing a better physical and electrical engagement of the contacts, as well as to facilitate the free movement of a shiftable structure by which the cooperating contacts are carried.

The foregoing and numerous other objects of the invention will more clearly hereinafter appear from the following detailed description of a preferred embodiment of the invention, and from the accompanying drawings, in which, to illustrate and describe the present improvements in a fully operative and illustrative organization, the features are utilized in connection with a conveyor weighing apparatus of a type employing a mechanical integrator system with a belt conveyor, and in which one of the variables, in the present instance the loading of the weighing portion of the belt conveyor, is put into the integrating mechanism through the beam of a weighing scale to which the present improvements are applied.

In the drawings:

Fig. 3 is an enlarged front elevation of the beam, equalizer bar, integrator bracket, and cooperating parts;

Fig. 4 is a top plan view of the equalizer bar and associated parts shown in Fig. 3;

Fig. 5 is a vertical section of the integrator bracket on the line 5—5 of Fig. 3.

Figure 2:
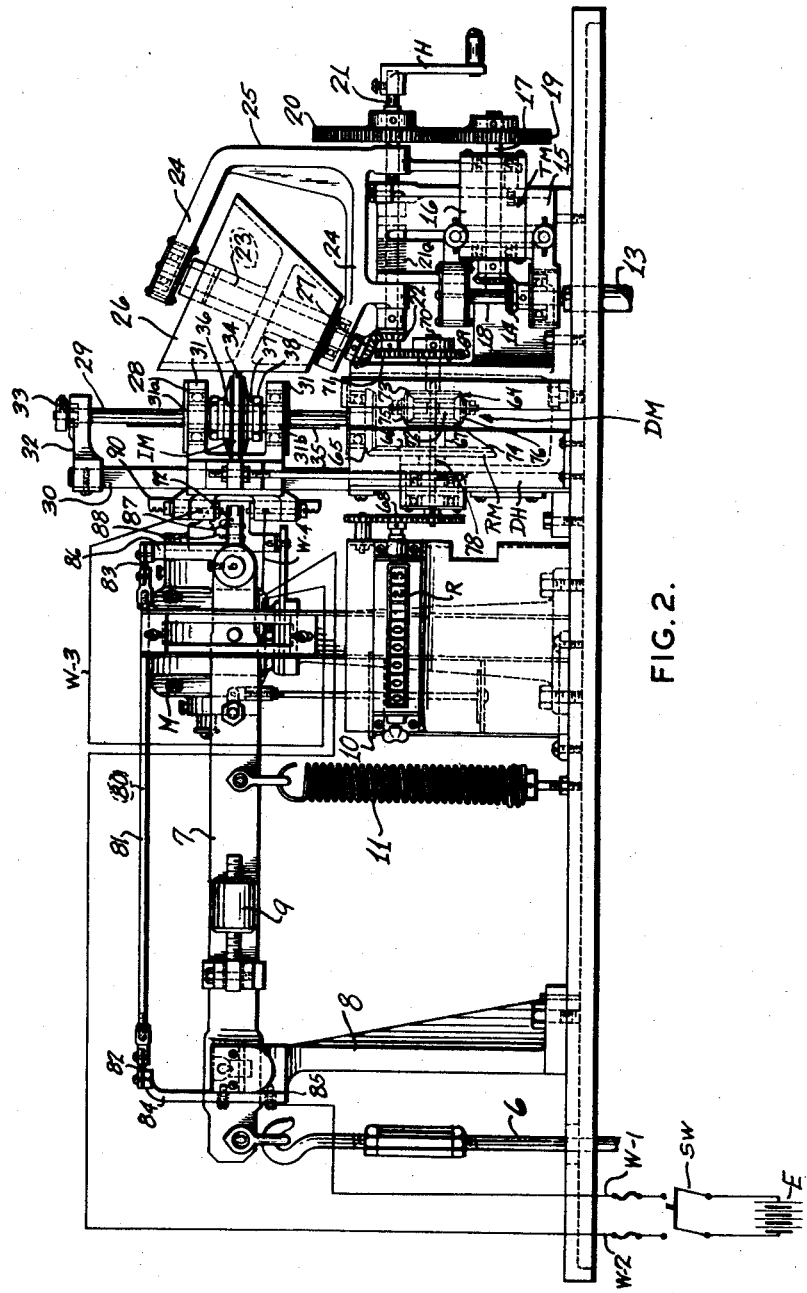
Fig. 2 is a front elevation of the beam and the associated integrator unit including the equalizer bar co-operating with the beam and the integrator bracket, together with the operating mechanism of the integrator and the tonnage register.

In the conveyor scale shown in the drawings, 1 designates a continuously movable load conveyor belt adapted to travel over spaced rollers 2 carried by a weighing frame 3, which is responsive to the weight of the load on a predetermined length of the conveyor belt, indicated at A—A, and which may be described as a weighing station WS. The weighing frame 3, functioning after the manner of a scale platform, is suspended from the scale shelf levers 4 by spaced suspension rods 5, while the shelf levers 4 are connected through a double bearing assembly by the draft rod 6 to the scale beam 7, (Fig. 2) which is fulcrumed in a vertical standard 8, and has connected thereto a balance ball 9, a dashpot 10 and a coil tension spring 11 so arranged and of such loading as automatically to counterbalance the weight of the frame 3 and other parts of the weighing mechanism.

The driving mechanism for the integrator assembly includes a traction drum 12, which is engaged and rotated by the lower pass of the load conveyor belt 1, and is operatively connected by a flexible shaft 13 by means of a miter gear 14 (Fig. 2) at its upper end, to a motion transmitting mechanism TM. The latter mechanism is carried by a standard 15 and includes an adjustable bracket 16, in which is mounted a horizontal main drive shaft 17 carrying on its inner end a miter gear 18 meshing with the miter gear 14 and having on its outer end a spur gear 19, which engages a spur gear 20 carried at the outer end of a horizontal auxiliary drive shaft 21, on the inner end of which is attached a miter gear 22. Mounted on an inclined shaft 23, preferably in ball bearings in the spaced arms 24 of a bracket 25, is an inverted hollow driving cone 26 forming operating means for the integrating mechanism IM (Fig. 2), the cone being rotated by a miter gear 27 carried by the cone shaft 23 and meshing with the miter gear 22 on the cone drive shaft 21.

Figure 1:
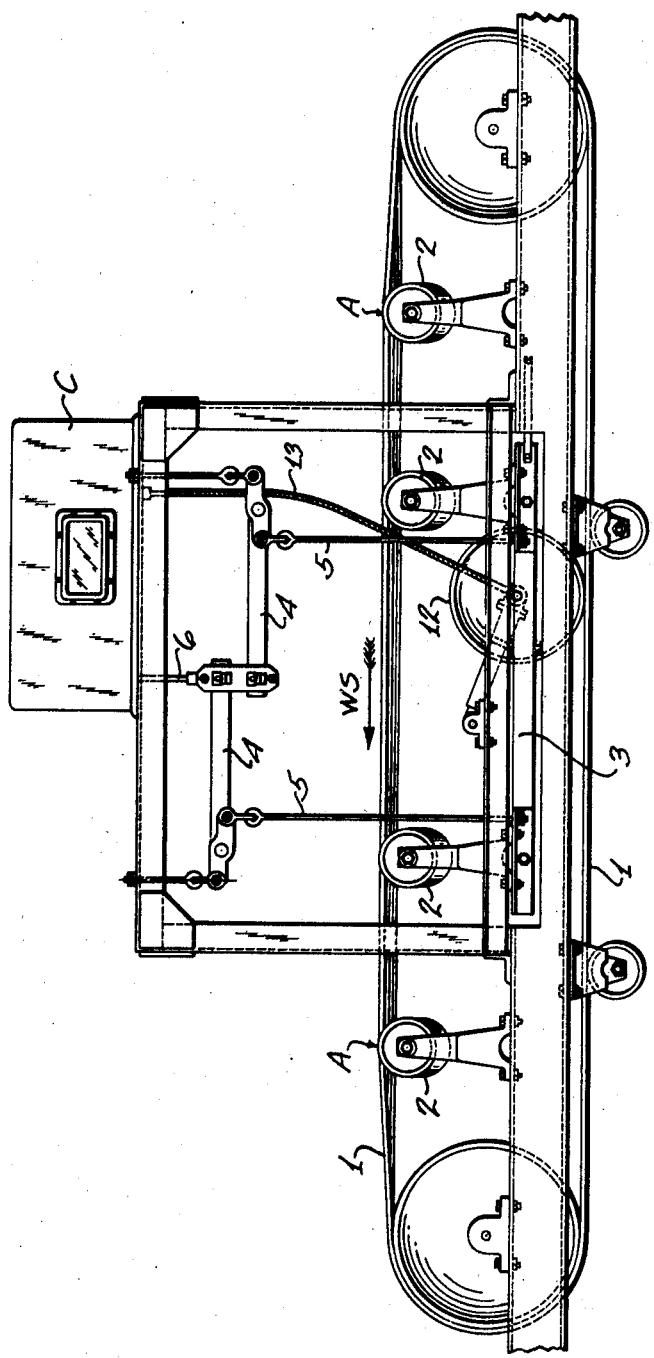
Fig. 1 is a front elevation of a conveyor for scales, showing especially the traveling load conveyor apparatus and portions of the associated weighing mechanism.

Disposed in a vertical position and adjacent to the rotatable cone 26 is the integrating mechanism IM, which includes an integrator bracket 28 slidably mounted on a vertical, rotatable integrating shaft 29 and two fixed square-sectioned guide bars 30 spaced therefrom and mounted on the housing DH of the differential assembly DM. The shaft 29 is adapted to extend through and rotate freely in openings 31a and 31b in the bracket arms 31, and has its upper end journalled in ball bearings located in a laterally extending arm 32 attached to the upper end of the guide bar 30, and having mounted on the upper end a set collar 33. Between the spaced arms 31 of the integrator bracket 28 is disposed in a horizontal plane a rubber-tread integrating wheel 34, which is rotatable constantly, in a clockwise direction when the belt 1 is directioned as shown by the arrow in Fig. 1. The wheel 34 is mounted in ball bearings carried in the spaced bracket arms 31, the bracket being vertically slidable and guided by a spline 35 carried by the vertical integrator shaft 29. For the purpose of variably positioning the driving cone 26 to obtain proper pressing contact and engagement of the cone with the integrating wheel 34, a spiral compression spring 21a is mounted on the cone drive shaft 21 between a suitable fixed abutment (not shown) and the cone bracket 25. The integrating wheel 34 is carried by a tubular shaft 36, mounted on the integrator shaft 29, and encircled by annular rings 37 clamped thereon by locking nuts 38 engaging threaded portions on the tubular shaft 36, which shaft is provided with a vertical groove (not shown), adapted to slidably engage the spline 35, by which means the rotation of integrating wheel 34, irrespective of its axial position, is imparted to the integrator shaft 29. In operation the integrating wheel 34 is adapted to engage the inclined surface of the driving cone 26 and to be rotated thereby at different speeds in accordance with the variations in the position of the integrating wheel 34 on the surface of the driving cone 26, this variation being under influence of the changes in load, from time to time, on the load conveyor belt 1. The integrator shaft 29 is also operatively connected to gears cooperating with a tonnage register drive associated with the differential mechanism DM, hereinafter referred to.

Positioned below the integrator mechanism IM are the differential mechanism designated generally as DM, and the tonnage register operating mechanism RM. The differential mechanism DM may be briefly described as including an epicyclic train of gears 64, one of which gears cooperates with the cone drive shaft 21 and another with the integrator shaft 29. The tonnage register operating mechanism RM includes a miter gear 65 mounted on the lower end of the integrator shaft 29, which is operatively connected thereto, and meshes with a miter gear 66 provided with a hub 67 which carries a gear 74, hereinafter described, and which provides an indirect connection to the continuous tonnage register mechanism of the register R by a train of spur gears 68. The latter gears are so arranged as to cause to be registered various units of tonnage carried by the conveyor belt during a certain period of time, such as one hour. The drive for the differential mechanism further includes a vertical gear 69 mounted on the inner end of a drive shaft 70, and which meshes with a spur gear 71 mounted on the inner end of the cone drive shaft 21. In the epicyclic train of gears 64 an orbitally movable intervening stub shaft 72 is disposed in the open space between opposed vertical miter gears 73 and 74, while meshing therewith are spaced horizontal spur gears 75 and 76 mounted on the ends of the stub shaft 72, which shaft is fixedly attached to drive shaft 78 which actuates the register R.

In order to calibrate the position of the beam 7 and the integrating wheel 34 in relation to the driving cone 26, the conveyor belt 1 is operated without any load, the adjustable bracket 16 being lowered so as to free the gear 19 on the main drive shaft 17 from engagement with the gear 20 carried by the cone drive shaft 21. A manually operated handle H is attached to the outer end of the cone drive shaft 21, by which means the shaft 21 and integrating wheel 34 may be operated to make any required adjustments.

From the description of parts it will have appeared that gear 73, being driven from the flexible shaft through gears 14 and 18, shaft 17, gears 19 and 20, shaft 21 and gears 71 and 69, will rotate at a speed proportionate to conveyor belt speed. The opposite bevel gear of the differential assembly, viz. 74, is primarily influenced by the variable rate of rotation of the integrating wheel 34, according to the position the latter assumes with respect to the cone 26. The rotation of the integrator wheel is imparted through gear 65 to gear 66 through its hub 67 to gear 74. Through the well known differential action afforded by the relation of the gears 73, 74, and the spur gears, the two variables consisting of variations in loading of the conveyor belt, and the speed of the belt, are integrated and reflected in the resulting rotation of the stub shaft 72 and the spur gears mounted thereon which rotation is imparted through the shaft 78, gear train 68, thence to the tonnage register R. It is of course understood from previous description that the vertical position of the integrator mechanism, hence the integrator wheel 34, on the shaft 29, is under the influence of the scale beam and hence under the influence of the variable loading of the weighing section or station, of the conveyor belt. The operation of the differential assemblies in integrating the variables referred to, is very similar to that shown and described in U. S. Patent 1,032,183 to W. P. Buchan, and since the differential mechanism forms, of itself, no feature of present novelty, it is thought to require no further description.

Although certain novel features of design are included in the integrating mechanism and its parts, the description thus far has included these features principally for completeness. It will be observed that the various means for translating the belt conveyor movement into the cone and integrating wheel provides a rugged, dependable and compact assembly for this purpose. This assembly may, for appearance and protection, be advantageously enclosed by a protective cover C (Fig. 1), provided with a window or port enabling easy observation of the readings taken from time to time as they appear on the register R.

Proceeding now to a description of the means by which the movements of the scale beam are carried into the integrator mechanism, or otherwise translated to a register, recording device, or the like, it will have been noted particularly from Figs. 2, 3, 4 and 5, how the oscillations of the scale beam 7 are brought to effect the desired axial displacements of the integrator mechanism, specifically the integrator wheel 34.

Mounted above the beam 7 and spaced therefrom is an equalizer bar 80, disposed in a plane parallel to the beam and designed to maintain the cooperating electrical contacts influencing the integrator mechanism, in efficient operative positions, as is hereinafter described. The equalizer bar is provided with an insulating cover 81 and is yieldably mounted at its ends by resilient fulcrum plates 82 and 83, the plate 82 being attached to the upper end of a vertical support 84, secured to the upright beam standard 8 and insulated therefrom by an insulator plate 85, while the plate 83 is secured to an electric contactor bracket 86 pivotally mounted on the free end of the beam 7 and adapted to control the electric circuit to a reversible electric motor M. The motor shaft (not shown) is geared to a shaft 87 carrying a pinion 88, which engages a vertical rack 90 secured to the integrator bracket 28, whereby the motor will cause the bracket to be raised or lowered. The contactor bracket 86 is L-shaped, and comprises an upright arm 91 and a lateral arm 92 at a right angle thereto, the arms forming a bell crank, and having at their junction an annular base portion 93, which is pivotally mounted on a shaft 94 carried by fixed insulating bushings 95. The pivotal connection between the L shaped bracket 86 and the shaft 94, is preferably made through antifriction bearings so as to minimize friction at rest. A suitable arrangement consists of roller bearings 96 located between the spaced arms 97 extending from the free end of the beam 7, and separated therefrom by insulating spacers 100 (Fig. 5).

Attached to the lateral contactor arm 92 are spaced upper and lower leaf springs 101 and 102, provided with electrical contacts 103 and 104 (Fig. 3), disposed over clearance recesses 105 and 106 in the contactor arm 92. These contacts are in circuit with the motor M and adapted to engage electrical contact pins 107 and 108 carried by laterally extending arms 110 and 111 of the integrator bracket 28 and resiliently mounted on spiral springs (not shown) located in insulated tubes 112 and 113, the contact pins extending through insulating plates 114 and 115, respectively, which plates are attached to the arms 110 and 111.

Electric wires W—1 and W—2 in circuit with an electric source E, conduct the electric current therefrom under control of a switch SW, the wire W—1 leading to the equalizer bar 80 serving as a conductor, and hence to the contacts 103 and 104 of the contactor bracket 86, the wire W—1 being attached to the support 84, which is insulated from the standard 8 by the insulator plate 85, while wire W—2 leads directly to the motor M. The wire W—3 leads from the motor to the upper contact pin 107 carried by the integrator bracket 28, and the wire W—4 leads from the motor M to the lower contact pin 108, whereby upon the selective engagement of the cooperating contacts and contact pins, the circuit is closed to the motor M and its forward or reverse direction of operation effects raising or lowering accordingly, of the integrator bracket 28 and integrating wheel 34.

As the beam 7 moves up and down the upper and lower contacts 103 and 104 engage their respective contact pins 107 and 108, whereby the circuit is closed accordingly to the reversible motor M, energizing the motor and thus causing it under control of the freely moving beam to automatically raise or lower by means of the rack 90, the integrator bracket 28 and the integrating wheel 34 in accordance with variations in one of the functions to be integrated, in the example shown, this being the variable weight of the load. Therefore, by this means the correct position of the integrating wheel 34 on the face of the driving cone 26 is effected under operative control of the motor M as controlled by the beam 7, which serves primarily in its operative relation to the integrating mechanism IM to cause, by means of the engagement of the opposed electrical contacts, the reversible motor M to move the integrator bracket 28 and thereby the integrating wheel 34 along the face of the driving cone 26.

The equalizer bar 80 and its associated elements constitute an important feature of the invention, being resiliently mounted for a limited pivotal movement on a resilient fulcrum independent of the beam, and yet functions in cooperation therewith, to maintain the contactor arm 92 constantly in a true vertical course and in a horizontal plane. As the contactor arm 92 is moved up and down, it is subjected to pivotal movement in a slight arc, and thus causes a wiping engagement of the electrical contacts, thereby assuring clean surfaces and efficient operative contact. Thus the movements of the contactor arm 92 and the cooperating integrator bracket 28 are equalized, thereby greatly facilitating free operation of the coacting parts and eliminating any jamming thereof, as well as avoiding excessive wear of the several contacts and contact pins.

To amplify somewhat further the action of the equalizer bar 80 and bellcrank lever 86 with associated elements, it will appear that these parts coact with the beam 7 somewhat after the manner of a parallelogram linkage. As the beam 7 is raised, the engagement of the upper contact and contact pin will serve to rock the lever 91 in a clockwise direction (Fig. 3) about its pivot, while the opposite pivotal effect will be produced when the beam is lowered under decrease of wegiht in the weighing station. Although the beam will, of course, tend to lower itself by gravity under decrease of weight of material, it is greatly preferred in most installations, to utilize a balanced beam assembly such as provided for in the current instance by the spring 11.

Incidental of course to any substantial displacement of the beam in either direction, it will be understood that the plate fulcrum connections 82 and 83 provide for a limited pivotal movement between the respective ends of the equalizer bar, the support 84 at one end, and the parts 80 and 86 at the other end of the equalizer bar assembly. Thus, in effect, the plate fulcrum attachments 82 and 83 function essentially as pivotal connections, after the manner of the plate fulcra employed in certain types of weighing scale assemblies.

Although there has been selected as an illustrative usage of the equalizer bar and contact assemblies, a combination with a conveyor scale embodying integrating mechanism, it is to be understood that the essential features of design of the equalizer bar, the contacts and contact pins associated therewith may be employed in other settings, particularly in connection with scales. It so happens because of the combination selected for present illustration that engagement of either pair of the cooperating contacts results in a movement of the assembly of relatively fixed contacts, being the contact pins 107 and 108. It will however be understood that the device is useful and operative with numerous advantages, even though the assembly of outside contacts such as 107 and 108, be fixed rather than displaceable under the influence of the apparatus controlled by the electric system.

Although the invention has been described by making specific reference to a preferred embodiment, such description is to be understood as illustrative and not limiting, since many changes may be made in the parts, arrangement and combinations, without departing from the full intended scope of the invention as defined by the claims hereunto appended.

I claim:

1. Registering mechanism of electromechanical type for use in combination with a beam type scale, the mechanism including an electric servomotor, a contact bracket mounted for slidable substantially linear movement in either direction as impelled by said servomotor, said bracket being operatively associated with weight value registering means, and a self-opening switch structure including a pair of spaced contact elements on said linearly movable bracket, cooperating contacts movable with the scale beam, and extending into the zone between the contact elements on said bracket, an arm, the last said contacts being carried by said arm, said arm being pivotally mounted on the scale beam, and a connection between said arm and a stationary portion of the scale assembly, arranged for yieldably opposing pivotal movement of the last said contacts with respect to the beam, the several contacts and contact elements being in circuit with said servo-motor in circuit-closing and circuit-opening relation thereto.

2. In a conveyor scale assembly in combination with an integrator mechanism of registering type, and a scale beam in the scale assembly, electromechanical apparatus for imparting variable weight values to the integrator mechanism in accordance with oscillations of the scale beam, said apparatus including a reciprocally movable member, a motor for moving said member in either direction, and an integrator wheel axially movable with said member; a contact assembly for translating scale beam movement to movements of said reciprocal member, said contact assembly being in circuit with the motor and including a plurality of cooperating contacts carried respectively by the beam and the reciprocal member, one of said contacts being pivotally associated with the member by which it is carried, and a connection, including resilient means, between the pivoted contact and a stationary part of the assembly, for yieldably limiting the pivotal displacement of the last said contact responsively to movement of the scale beam, and adapted to maintain the contacts more nearly in parallelism than if fixedly supported.

3. In combination with a scale including a scale beam, electromechanical weight registering mechanism including a linearly reciprocable element, and further including means for determining the direction and extent of movement of said element in response to varying weight values to which the scale is subjected, said electromechanical mechanism further including electrically energized means for actuating said reciprocable element in response to scale beam displacement, and a contact assembly including contact means on the reciprocable element, contact means on the scale beam, and means, other than the contacts, tending yieldably to urge the beam-mounted contact means toward a relation of parallelism to the first contact means, as the scale beam is arcuately moved under influence of the differing weight values.

4. In combination with a beam type scale and an electromechanical weight-influenced mechanism, a contactor device in circuit with the electrical elements of said mechanism, and including a beam stop structure provided with a pair of spaced abutment arms, contacts carried by the arms and insulated therefrom, a cooperating contact structure, movable into abutment with either of the arm-carried contacts, and an articulate linkage through which the last said contact structure is displaceably mounted on the beam of the associated scale, the linkage including a resilient element through which the last said contact structure is connected to a stationary anchorage and is constrained to a limited range of displacement with respect to the beam and biased toward parallelism with the first said contacts.

5. In combination with a weighing scale including a scale beam, a spring element engaging the beam, and being of such characteristics as substantially to balance the beam under no-load conditions of the scale, electromechanical weight-influenced mechanism in operative association with the scale and including a contactor device in circuit with the electrical elements of said mechanism, the contactor device including a pair of spaced contacts mounted in the path of the end of the beam, a cooperating contact movable with the beam, a pivotal connection between said last named contact and the beam, and an assembly of jointedly-related elements connecting the last said contact and a stationary anchorage, by which the last said contact is limited in its movement with respect to the beam.

6. In combination with a weighing scale including a scale beam and a beam fulcrum standard, electromechanical weight-influenced mechanism operatively related to the scale, and including an assembly of spaced contacts in a circuit of the electromechanical mechanism, a displaceable end element on the beam having a contacting portion electrically associated with the electromechanical mechanism, said contacts being located in the path of said element for engagement thereby, a pivot structure by which said element is connected to the beam, and a motion-limiting connection between said end element and the beam standard, adapted responsively to beam movement, to displace said end element about its pivot and toward parallelism with one of the spaced contacts to be engaged by the end element.

7. In combination with a weighing scale including a scale beam, electromechanical weight-influenced mechanism functionally associated with the scale through the beam, an assembly of spaced contacts near the path of the beam end, and in electrical circuit relation to the electromechanical mechanism, a lever pivoted to the end of the beam, contact means on the lever also in circuit relation to the electromechanical mechanism and cooperating with those of said assembly, and a yieldable connection between said lever and a fixed anchorage element on the scale, tending, as the beam is moved, to keep the lever-carried contact means more nearly aligned with the assembly of spaced contacts.

8. The combination recited in claim 7 further characterized in that the yieldable connection to the beam end lever, serves to complete an electric circuit between the contact means carried by said lever, and the electromechanical weight-influenced mechanism.

9. In a combination including a weighing scale provided with a scale beam and a functionally associated electromechanical weight-influenced mechanism, an electrical contactor assembly in circuit relation with the electromechanical mechanism and including a beam end contact and co-operating contacts, an arm of angular form displaceably connecting the beam-end contact to the beam, an equalizing linkage associated with said arm and comprising a rod pivotally connected to the arm, and a fixed anchorage to which the rod is also connected at a point remote from the free end of the beam.

10. In combination with a scale including a scale beam, and an electromechanical weight-influenced mechanism functionally associated with the scale, an electrical contactor assembly in circuit with the electromechanical mechanism and including a beam-carried contact and a plurality of contacts cooperating therewith, a bell crank lever having an arm displaceably connecting the beam-carried contact to the beam, an equalizing linkage connected to another arm of the lever and comprising a rod pivotally connected at one end to the last said arm, a fixed anchorage element located near the beam fulcrum, and to which the other end of the rod is pivotally connected.

11. A weighing scale provided with a scale beam and beam standard, an electromechanical weight-influenced mechanism functionally associated with the scale, an electrical contactor assembly for relating movements of the scale beam to the electromechanical mechanism, the contactor assembly including a bracket having spaced arms, a pair of contact pins projecting toward each other inwardly from said arms, a resilient and insulated support for each of said contact pins on the arms of said bracket, an angulate lever on the beam, a contact carried by one arm of said lever and normally projecting between the contact pins of said bracket, and an articulate linkage connecting the angulate lever to the beam standard.

12. A contactor assembly for use with a beam type scale and associated electromechanical weight-influenced mechanism, the contactor assembly including a reciprocable contact carrier, a bracket on said carrier, a pair of arms spaced from each other on said bracket, a contact pin carried by each of said arms and insulated therefrom, a resilient mounting for each of said contact pins, the contact pins being normally spaced from each other and arranged for movement in a path adjacent the free end of the scale beam, a bell crank lever mounted near the free end of the beam, one of the arms of said lever being provided with a contact normally projecting between and spaced from the contact pins, an insulated rod pivotally connected to the opposite arm of the bell crank lever, a supporting post mounted adjacent the fulcrum of the beam and a pivotal connection between the opposite end of said rod and said supporting post.

HARLAN A. HADLEY.